(12) United States Patent
Koike et al.

(10) Patent No.: US 7,936,503 B2
(45) Date of Patent: May 3, 2011

(54) LASER SCANNING MICROSCOPE

(75) Inventors: Tetsuya Koike, Komagane (JP); Toshiyuki Hattori, Hachioji (JP)

(73) Assignee: Olympus Corporation, Tokyo (JP)

( * ) Notice: Subject to any disclaimer, the term of this patent is extended or adjusted under 35 U.S.C. 154(b) by 439 days.

(21) Appl. No.: 12/069,519

(22) Filed: Feb. 11, 2008

(65) Prior Publication Data
US 2008/0278801 A1    Nov. 13, 2008

(30) Foreign Application Priority Data

Feb. 19, 2007  (JP) .................................. 2007-037832

(51) Int. Cl.
*G02B 21/06*  (2006.01)
*G02B 21/00*  (2006.01)

(52) U.S. Cl. .......................... 359/388; 359/368; 359/385

(58) Field of Classification Search ........... 359/368–390
See application file for complete search history.

(56) References Cited

U.S. PATENT DOCUMENTS

| 5,534,970 | A  | * | 7/1996  | Nakashima et al. | ............ | 355/53  |
| 6,693,272 | B2 | * | 2/2004  | Adachi et al.    | ............ | 250/216 |
| 7,733,565 | B2 | * | 6/2010  | Hattori et al.   | ............ | 359/385 |
| 2002/0036824 | A1 | * | 3/2002 | Sasaki        | ............ | 359/385 |
| 2003/0197924 | A1 | * | 10/2003 | Nakata        | ............ | 359/368 |
| 2005/0263690 | A1 | * | 12/2005 | Araya et al.  | ............ | 250/234 |
| 2007/0025401 | A1 | * | 2/2007  | Hayashi et al.| ............ | 372/22  |

FOREIGN PATENT DOCUMENTS

| JP | 2004-233351 A | 8/2004  |
| JP | 2005-345614 A | 12/2005 |

* cited by examiner

*Primary Examiner* — Thong Nguyen

(74) *Attorney, Agent, or Firm* — Holtz, Holtz, Goodman & Chick, PC

(57) ABSTRACT

A laser scanning microscope separates fluorescence signals of different fluorophores in accurate unmixing by eliminating positional pixels shifts between different fluorescence images obtained through irradiation of different-wavelength laser lights. The microscope includes a laser light source capable of emitting a wavelength-changeable laser light, a correction amount determination unit that determines a correction amount for correcting an optical axis shift of the laser light, an optical axis adjusting unit that adjusts an optical axis, a scanning unit that performs two-dimensional scanning, an objective lens that focuses the laser scanning light to a specimen and fluorescence emitted from the specimen, a light detector that detects the fluorescence, and a control unit that changes the wavelength of the laser light synchronously with the scanning by the scanning unit while controlling the optical axis adjusting unit based on the correction amount determined by correction amount determination unit.

12 Claims, 4 Drawing Sheets

LASER SCANNING MICROSCOPE

BACKGROUND OF THE INVENTION

1. Field of the Invention

The present invention relates to laser scanning microscopes.

This application is based on Japanese Patent Application No. 2007-037832, the content of which is incorporated herein by reference.

2. Description of Related Art

There is a known technique for separating some different fluorescence each of whose wavelength components are overlapping each other, by unmixing processing a set of images obtained through use of a laser light source whose wavelength is changeable, such as a pulsed laser light source (see Japanese Unexamined Patent Application, Publication No. 2004-233351, for example).

In the known technique disclosed in Japanese Unexamined Patent Application, Publication No. 2004-233351, however, since a pulsed laser light source whose wavelength is changeable is used, the optical axis of the optical path running from the laser light source to the specimen may be shifted when the wavelength of the laser light is varied.

If the optical axis of a laser light is shifted while the wavelength of the laser light is sequentially varied, pixels of each fluorescence image obtained by irradiating laser lights of different wavelengths may also be positionally shifted from each other. Consequently, unmixing processing of such a plurality of fluorescence images whose pixels are positionally shifted from each other results in a meaningless process because pixels of different images have no commonality. Accordingly, spectral unmixing (separating the fluorescence signals of different fluorophores) cannot be achieved.

BRIEF SUMMARY OF THE INVENTION

The present invention provides a laser microscope that can obtain fluorescence images whose positional shifts between pixels of different fluorescence images obtained through irradiation of laser lights having different wavelengths are eliminated, then accurate unmixing processing to separate the fluorescence signals of different fluorophores can be realized.

According to a first aspect of the present invention, a laser scanning microscope includes a laser light source capable of emitting a laser light whose wavelength is changeable, a correction amount determination unit that determines a correction amount for correcting an optical axis shift of the laser light by changing the laser light having the different wavelength, a scanning unit that performs two-dimensional scanning with the laser light emitted from the laser light source, an objective lens that focuses the laser light from the scanning unit to a specimen and collects fluorescence emitted from the specimen, a light detector that detects the fluorescence collected by the objective lens, and a control unit that changes the wavelength of the laser light from the laser light source synchronously with the scanning the laser light performed by the scanning unit while controlling the optical axis adjusting unit on the basis of the correction amount of the optical axis shift determined by the correction amount determination unit.

In the first aspect, the scanning unit performs two-dimensional scanning with the laser light emitted from the laser light source, and the laser light is focused by the objective lens to be irradiated to the specimen, whereby a fluorescent material contained in the specimen is excited to emit fluorescence. The emitted fluorescence is collected by the objective lens and is detected as fluorescence intensity information by the light detector. By storing scanning positions of the scanning unit in association with the fluorescence intensity information, a two-dimensional fluorescence image can be obtained.

When the wavelength of the laser light is changed, the optical axis of the laser light is shifted. The correction amount determination unit determines a correction amount for correcting an optical axis shift while the optical axis adjusting unit adjusts the optical axis so as to eliminate the shift in the optical axis on the basis of the correction amount. Therefore, even if the wavelength of the laser light is varied, the laser light can be irradiated to the specimen along a constant optical axis. Further, the control unit causes the wavelength of the laser light emitted from the laser light source to change synchronously with the laser light scanning performed by the scanning unit, while controlling the optical axis adjusting unit to eliminate the shift in the optical axis. Therefore, even if the wavelength of the laser light is varied, fluorescence images with the same optical axis can be obtained. Consequently, positional pixel shifts between fluorescence images obtained through irradiation of laser lights of different wavelengths can be eliminated, whereby accurate unmixing can be performed.

The laser scanning microscope according to the first aspect may further include an optical axis shift detecting unit that detects the amount of an optical axis shift by varying the laser light having the different wavelength, the correction amount determination unit may determine the correction amount on the basis of the detected amount of the optical axis shift.

The laser scanning microscope according to the first aspect may further include a light modulating unit that adjusts intensity of the laser light, a storage unit that stores wavelength information of the laser light in association with intensity information of the laser light, and a light modulating control unit that controls the light modulating unit in accordance with the intensity information of the laser light stored in the storage unit when the wavelength of the laser light emitted from the laser light source is changed.

When the wavelength of the laser light emitted from the laser light source is varied, the intensity of the laser light emitted from the laser light source varies.

With the above-described configuration, when the wavelength of the laser light emitted from the laser light source is changed, the light modulating control unit controls the light modulating unit in accordance with the intensity information stored in the storage unit in association with the wavelength information. Therefore, a laser light with a constant intensity can be irradiated whether or not the wavelength is changed. Consequently, variations in the intensity of fluorescence images obtained for different wavelengths can be suppressed.

The laser scanning microscope according to the first aspect may further include a light modulating unit that adjusts intensity of the laser light, a power monitor that detects the intensity of the laser light, and a light modulating control unit that controls the light modulating unit such that the intensity detected by the power monitor is maintained at a constant level when the wavelength of the laser light emitted from the laser light source is changed.

With such a configuration, the light modulating control unit controls the light modulating unit such that the intensity detected by the power monitor is maintained at a constant level. Therefore, even if the wavelength of the laser light emitted from the laser light source is changed, a laser light with a constant intensity can be irradiated. Consequently, variations in the intensity of fluorescence images obtained for different wavelengths can be suppressed.

The laser scanning microscope according to the first aspect may further include a sensitivity control unit that adjusts the sensitivity of the light detector in accordance with the wavelength of the laser light emitted from the laser light source.

With such a configuration, when the intensity of the laser light emitted from the laser light source changes with the wavelength thereof, the sensitivity control unit adjusts the detection sensitivity of the light detector. Therefore, even if the wavelength is changed, fluorescence images with a constant intensity can be obtained.

The laser scanning microscope according to the first aspect may further include a storage unit that stores, in association with the wavelength of the laser light emitted from the laser light source, an adjustment value for the optical axis adjusting unit controlled in response to change of the wavelength.

With such a configuration, an adjustment value for the optical axis adjusting unit is stored in the storage unit in association with the wavelength for each change of the wavelength. Therefore, when the same wavelength is selected afterward, the adjustment value stored in the storage unit is used to realize quick optical axis adjustment using the optical axis adjusting unit, without requiring the optical axis shift detecting unit to perform detection and the control unit to identify the adjustment value for the optical axis adjusting unit.

In the laser scanning microscope according to the first aspect, the scanning unit may include a driving mechanism that moves a scanning plane of the laser light in a direction of the optical axis relative to the specimen, and the control unit may operate to change the wavelength of the laser light synchronously with three-dimensional scanning in which the driving mechanism moves the scanning plane in the direction of the optical axis while two-dimensional scanning with the laser light is performed along a focal plane of the objective lens.

With such a configuration, the number of changing operation of the laser light wavelength can be minimized, whereby a three-dimensional fluorescence image with no positional pixel shifts can be obtained in a shorter time through irradiation of laser lights with different wavelengths.

According to a second aspect of the invention, a laser scanning microscope includes a laser light source capable of emitting a laser light whose wavelength is changeable, a storage unit that stores the wavelength of the laser light from the laser light source in association with a correction amount of an optical axis shift, an optical axis adjusting unit that adjusts the optical axis of the laser light emitted from the laser light source, a scanning unit that performs two-dimensional scanning with the laser light emitted from the laser light source, an objective lens that focuses the laser light from the scanning unit to a specimen and collects fluorescence emitted from the specimen, a light detector that detects the fluorescence collected by the objective lens, and a control unit that changes the wavelength of the laser light from the laser light source synchronously with the scanning with the laser light performed by the scanning unit while controlling the optical axis adjusting unit on the basis of the correction amount of the optical axis shift read from the storage unit.

According to the invention, separating the fluorescence signals of different fluorophores can be achieved in accurate unmixing processing realized by eliminating positional shifts between pixels of different fluorescence images obtained through irradiation of laser lights having different wavelengths.

DETAILED DESCRIPTION OF THE INVENTION

A laser scanning microscope 1 according to an embodiment of the present invention will now be described with reference to FIGS. 1 to 3.

Figure 1:
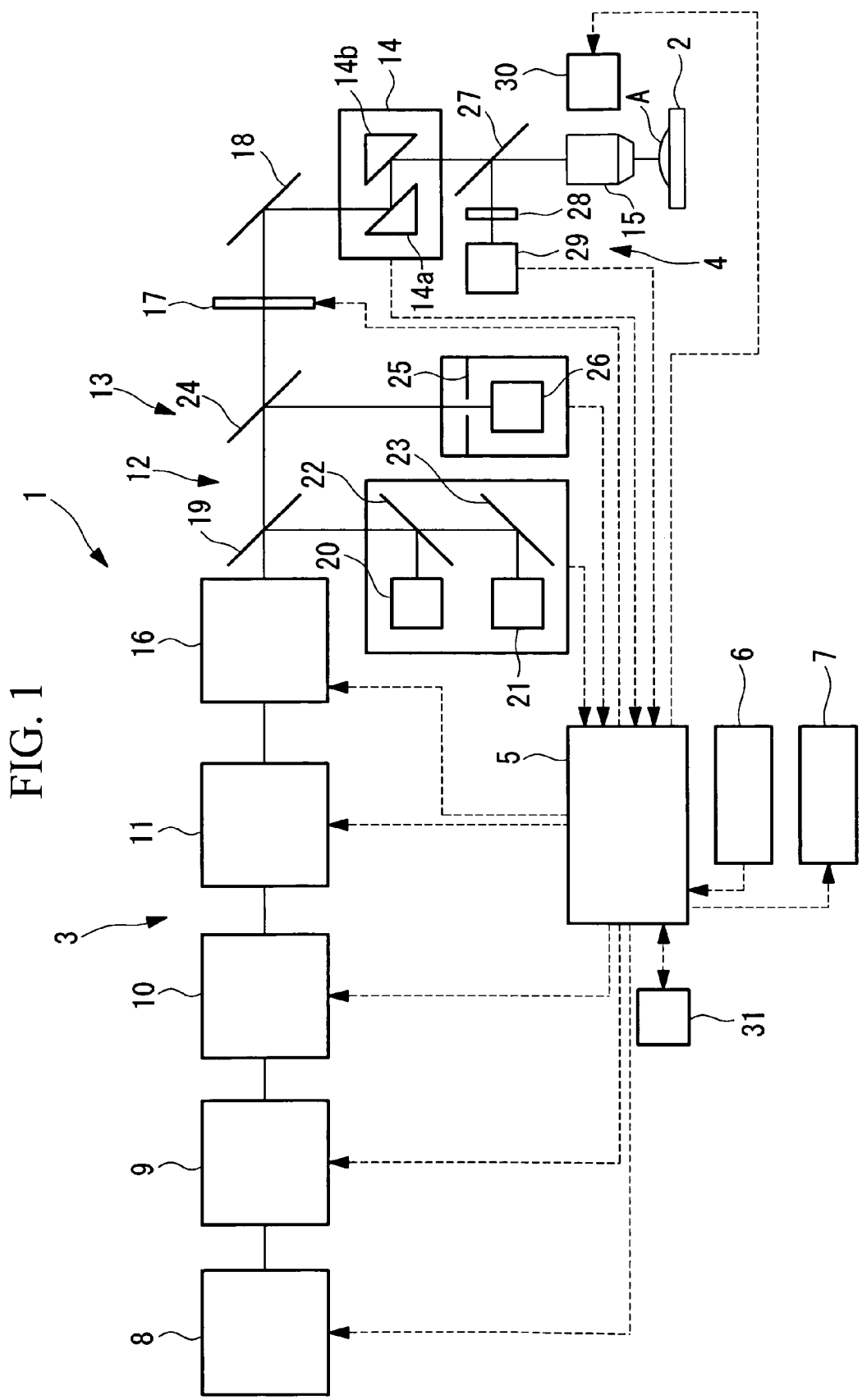
FIG. 1 is a block diagram showing the entire configuration of a laser scanning microscope according to an embodiment of the invention.

Referring to FIG. 1, the laser scanning microscope 1 according to the embodiment includes the following: an illumination optical system 3 that irradiates an ultrashort-pulse laser light (hereinafter referred to as a laser light) to a specimen A placed on a stage 2, an observation optical system 4 that detects fluorescence emitted from the specimen A, a control device 5 that controls the illumination optical system 3 and the observation optical system 4, an input device 6 for inputting various settings, and a display device 7 that displays an obtained fluorescence image.

The illumination optical system 3 includes the following: a laser light source 8 that can emit a multi-wavelength laser light; an acoustooptic element (light modulating unit) 9, such as an acoustooptic tunable filter (AOTF), that turns the laser light emitted from the laser light source 8 on or off, controls the emitted laser light, and selects the wavelength of the laser light; a negative-chirp (NC) unit 10 that preferentially transmits shorter-wavelength light; an optical axis adjusting unit 11 that can adjust the offset and inclination of the optical axis of the laser light; an optical axis shift detecting unit 12 that detects a shift in the optical axis of the laser light; a power monitor 13 that detects the intensity of the laser light; a scanner 14 that performs two-dimensional scanning with the laser light; and an objective lens 15 that irradiates the laser light from the scanner 14 to the specimen A and collects fluorescence emitted from the specimen A.

The illumination optical system 3 further includes a beam expander 16 that changes the focal plane of the laser light emitted through the objective lens 15 in the optical axis direction, and a shutter 17 that permits or blocks entry of the laser light into the scanner 14. In FIG. 1, a reference numeral 18 denotes a mirror.

The optical axis adjusting unit 11 is a combination of a motor and two flat mirrors (not shown). When the two flat mirrors are simultaneously moved in parallel, the optical axis of the laser light can be offset in a direction orthogonal thereto. When the flat mirrors are rotated about an axis orthogonal to the optical axis, the inclination angle of the laser light can be adjusted.

The optical axis shift detecting unit 12 includes, for example, a beam splitter 19 that separates a portion of the laser light from the optical path on the downstream side of the beam expander 16, and two sensors 20 and 21 that detect, via different optical path lengths, the portion of the laser light separated from the optical path by the beam splitter 19. Reference numerals 22 and 23 denote a beam splitter and a mirror, respectively.

Each of the sensors 20 and 21, which are sensors such as four-segment photodiodes, are configured to detect the amount of offset of the optical axis of the laser light in a direction orthogonal to the original optical axis on the basis of the output balance between four sensor segments (not shown) provided in correspondence with spot positions at which the laser light is received. In accordance with the difference between the amount of offsets detected by the two sensors 20 and 21 positioned via different optical path lengths, the inclination angle with respect to the original optical axis of the laser light is detected.

The scanner 14 includes, for example, two galvanometer mirrors 14a and 14b positioned opposite to each other and supported in such a manner that can be rocked back and forth about respective axes in two mutually orthogonal directions. With the scanner 14, the two galvanometer mirrors 14a and 14b are rocked synchronously, whereby a scanning operation with the laser light, such as two-dimensional raster scanning, can be performed.

The power monitor 13 includes, for example, a beam splitter 24 that separates a portion of the laser light from the optical path on the downstream side of the optical axis shift detecting unit 12; a diaphragm 25, which is the equivalent of an objective pupil, that transmits the portion of the laser light separated from the optical path by the beam splitter 24; and a sensor 26 that detects the laser light that has passed through the diaphragm 25.

The observation optical system 4 includes a dichroic mirror 27 that separates fluorescence collected by the objective lens 15 from the optical path of the laser light between the objective lens 15 and the scanner 14; a barrier filter 28 that removes the laser light from the fluorescence separated by the dichroic mirror 27; and a light detector 29, such as a photomultiplier, that detects the fluorescence transmitted through the barrier filter 28.

The control device 5 also works as a correction amount determination unit that determines a correction amount for correcting an optical axis shift of the laser light by changing the laser light having the different wavelength.

The control device 5 outputs a command signal for selecting a laser light wavelength to the acoustooptic element 9. Further, the control device 5 receives a detection signal from the optical axis shift detecting unit 12, calculates an adjustment value for the optical axis adjusting unit 11, and outputs the adjustment value to the optical axis adjusting unit 11. Further, the control device 5 outputs a command signal for adjusting the intensity of the laser light to the acoustooptic element 9 in accordance with the laser light intensity detected by the power monitor 13.

Further, the control device 5 notifies the negative chirp unit 10 of a chirp amount according to the laser light wavelength, and instructs the beam expander 16 to adjust the laser light diameter in accordance with the laser light wavelength.

Further, the control device 5 turns the shutter 17 to the off state so as to block the entry of the laser light into the scanner 14 when varying the laser light wavelength, and turns the shutter 17 to the on state so as to permit the irradiation of the laser light to the specimen A after completing the above-described adjustment operations.

Further, the control device 5 constructs a fluorescence image on the basis of information on the brightness of the fluorescence detected by the light detector 29 and information on the scanning position of the scanner 14, and outputs the image to the display device 7.

Operation of the laser scanning microscope 1 according to the embodiment having the above-described configuration will now be described.

Figure 2:
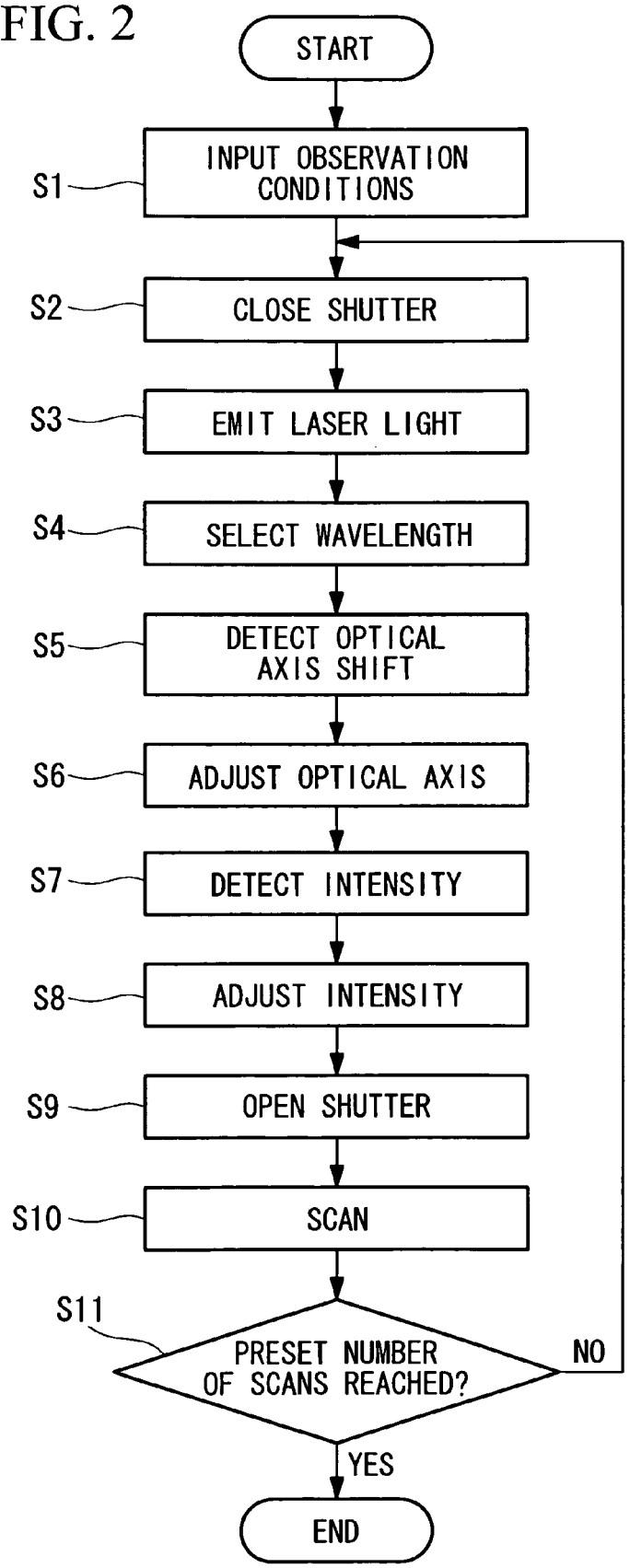
FIG. 2 is a flowchart showing the process of observation of a specimen through the laser scanning microscope shown in FIG. 1.
Figure 3:
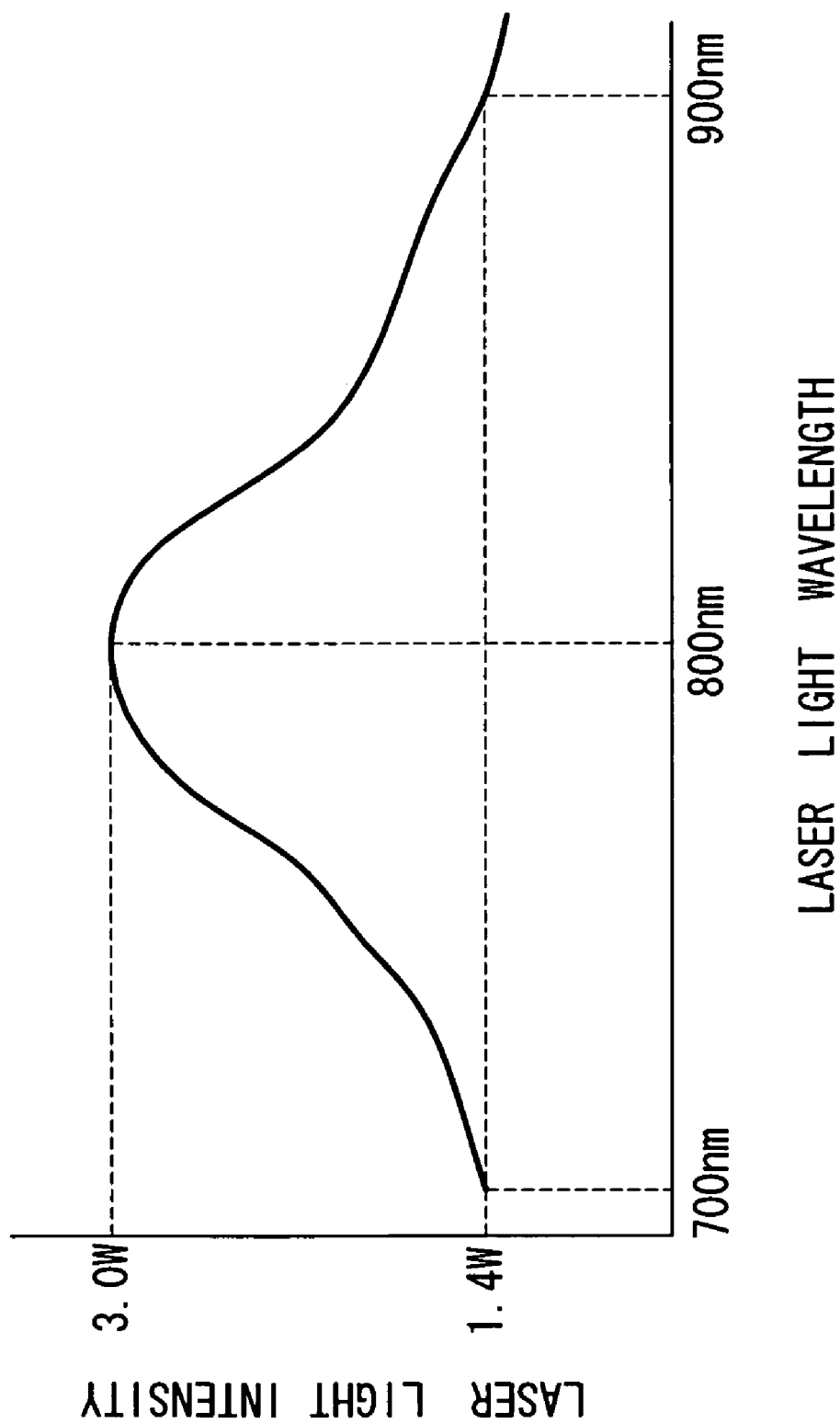
FIG. 3 is a graph showing a wavelength characteristic with respect to the intensity of a laser light emitted from a laser light source of the laser scanning microscope shown in FIG. 1.

FIG. 2 shows the process of fluorescence observation of the specimen A through the laser scanning microscope 1 according to the embodiment. In step S1, observation conditions are input to the control device 5 through the input device 6. This embodiment concerns the case where the wavelength of the laser light emitted from the laser light source 8 is changed, whereby a two-dimensional fluorescence image formed along the focal plane of the objective lens 15 is obtained for each wavelength.

The control device 5 controls necessary components in accordance with the input observation conditions. The observation conditions include desired laser light intensity and the number of laser light scans.

In step S2, the control device 5 outputs an off command signal to the shutter 17 so as to block the optical path running from the laser light source 8 toward the scanner 14. In this state, in step S3, the control device 5 causes the laser light source 8 to emit a laser. The laser light contains multi-wavelength light. Therefore, in step S4, the control device 5 inputs a wavelength selection command signal to the acoustooptic element 9 to cause the acoustooptic element 9 to emit a laser light having the selected wavelength.

Since a wavelength of the laser light has been selected, the optical axis and intensity of the laser light to be emitted from the acoustooptic element 9 varies. In response to this, in step S5, the optical axis shift detecting unit 12 detects the amount of offset and inclination angle of the optical axis. Then, in step S6, the control device 5 calculates an adjustment value for the optical axis adjusting unit 11 on the basis of the detection signals, thereby controlling the optical axis adjusting unit 11. Thus, a shift in the optical axis is eliminated at the optical axis shift detecting unit 12. In step S7, the power monitor 13 detects the laser light intensity. In step S8, on the basis of the intensity signal, the control device 5 commands the acoustooptic element 9 to adjust the intensity to the desired intensity, whereby the laser light is adjusted to a predetermined intensity.

In step S9, after the completion of the optical axis adjustment and intensity adjustment, the control device 5 outputs an on command signal to the shutter 17, whereby the laser light emitted from the laser light source 8 is made to output toward the scanner 14.

In step S10, the laser light enters the scanner 14 for two-dimensional scanning, and is collected by the objective lens 15 to be irradiated to the specimen A on the stage 2.

The irradiated laser light excites a fluorescent material contained in the specimen A, whereby fluorescence is emitted. Since an ultrashort-pulse laser light is used, multiphoton fluorescence is emitted in an extremely thin region along the focal plane of the objective lens 15 as a result of multiphoton excitation.

The emitted fluorescence is collected by the objective lens 15, is separated on the way back along the same optical path by the dichroic mirror 27, and is detected by the light detector 29 through the barrier filter 28.

Information on the intensity of the fluorescence detected by the light detector 29 and information on the scanning position of the scanner 14 at each moment of fluorescence detection are sent to the control device 5. The control device 5 associates and stores the two kinds of information. The scanner 14 performs raster scanning of a predetermined imaging region with the laser light, whereby a two-dimensional multiphoton fluorescence image is constructed and displayed on the display device 7.

In step S11 of the embodiment, when the laser light scanning of the predetermined imaging region is completed, whether or not the number of scans is equal to a preset number of scans is checked. If the preset number of scans is not reached, the process returns to step S2 to be repeated therefrom. If the preset number of scans is reached, the process ends.

With the laser scanning microscope 1 according to the embodiment, the laser light is maintained with a certain wavelength during a single scan for obtaining a multiphoton fluorescence image of a predetermined imaging region of the specimen A. Synchronously with the completion of each scan, the wavelength of the laser light is changed. For each change, the optical axis shift and the laser light intensity are corrected. Therefore, problems of positional pixel shifts and nonuniform fluorescence intensities between different fluorescence images obtained through irradiation of laser lights having different wavelengths can be eliminated.

Accordingly, an advantage is afforded in that a linear regression analysis using a plurality of fluorescence images obtained as above can realize accurate unmixing and separation of fluorescence components emitted with overlapping wavelengths through irradiation of laser lights having different wavelengths.

The laser scanning microscope 1 according to the embodiment is explained as an example of a multiphoton-excitation type using an ultrashort-pulse laser light. However, the microscope is not limited thereto, and may also be employed a confocal microscope using a continuous-wave laser light.

In the embodiment, the intensity of a laser light with any wavelength is detected by the power monitor 13 and is adjusted by the acoustooptic element 9 to obtain desired intensity. Instead of this, by providing a look-up table that stores associations between wavelengths and intensities of the laser light, the laser light intensity may be maintained at a constant level without the power monitor 13. Referring to FIG. 3, the laser light intensity varies in response to the laser light wavelength. Accordingly, with reference to a look-up table prepared on the basis of the relationship shown in FIG. 3, a command signal to be sent to the acoustooptic element 9 may be set to such a value as to maintain the laser light intensity at a constant level regardless of the laser light wavelength.

In the embodiment, the acoustooptic element 9 is used to turn the laser light on or off, adjust the laser light intensity, and select the laser light wavelength. Instead of this, a modulator of another type, such as an electrooptic element, may be used.

In the embodiment, the acoustooptic element 9 is used to adjust the laser light so as to maintain the intensity of the laser light to be irradiated to the specimen A at a constant level regardless of the laser light wavelength. Instead of this, the obtained fluorescence intensity may be adjusted instead of adjusting the laser light intensity. In other words, irradiation of a laser light having a wavelength characteristic shown in FIG. 3 to the specimen A causes the specimen A to emit fluorescence having intensity to be proportional to the irradiated intensity of the laser light. Accordingly, by adjusting the light-receiving sensitivity of the light detector 29 in accordance with a wavelength characteristic to be inversely proportional to the wavelength characteristic shown in FIG. 3, fluorescence images for which relative relationships of fluorescence intensities thereof are corrected independently from laser light wavelengths can be obtained.

A storage unit may also be provided for storing adjustment values set for the optical axis adjusting unit 11 and intensity adjustment values set for the acoustooptic element 9 every time the laser light wavelength is varied. With such a storage unit, when a laser light of the same wavelength is irradiated, adjustment values stored in the storage unit can be used. Consequently, the execution of alignment adjustment and power monitoring become unnecessary again, whereby observation time can be reduced.

In the embodiment, a multiphoton fluorescence image formed along a single focal plane of the objective lens 15 is obtained by changing in the laser light wavelength. In addition to this, a driving mechanism 30, as shown in FIG. 1, that moves the focal plane of the objective lens 15 in the optical axis direction during scanning may be provided. In that case, a plurality of two-dimensional multiphoton fluorescence images can be obtained along different focal planes of the objective lens 15, the focal planes being parallel to each other at intervals in the optical axis direction. If the interval is set to a sufficiently small, a three-dimensional multiphoton fluorescence image of the specimen A can be obtained.

In that case, by setting the laser light wavelength to change for every scan in the optical axis direction, the number of wavelength changing processes can be minimized, and a plurality of three-dimensional multiphoton fluorescence images resulting from irradiation of laser lights having different wavelengths can be obtained quickly.

Figure 4:
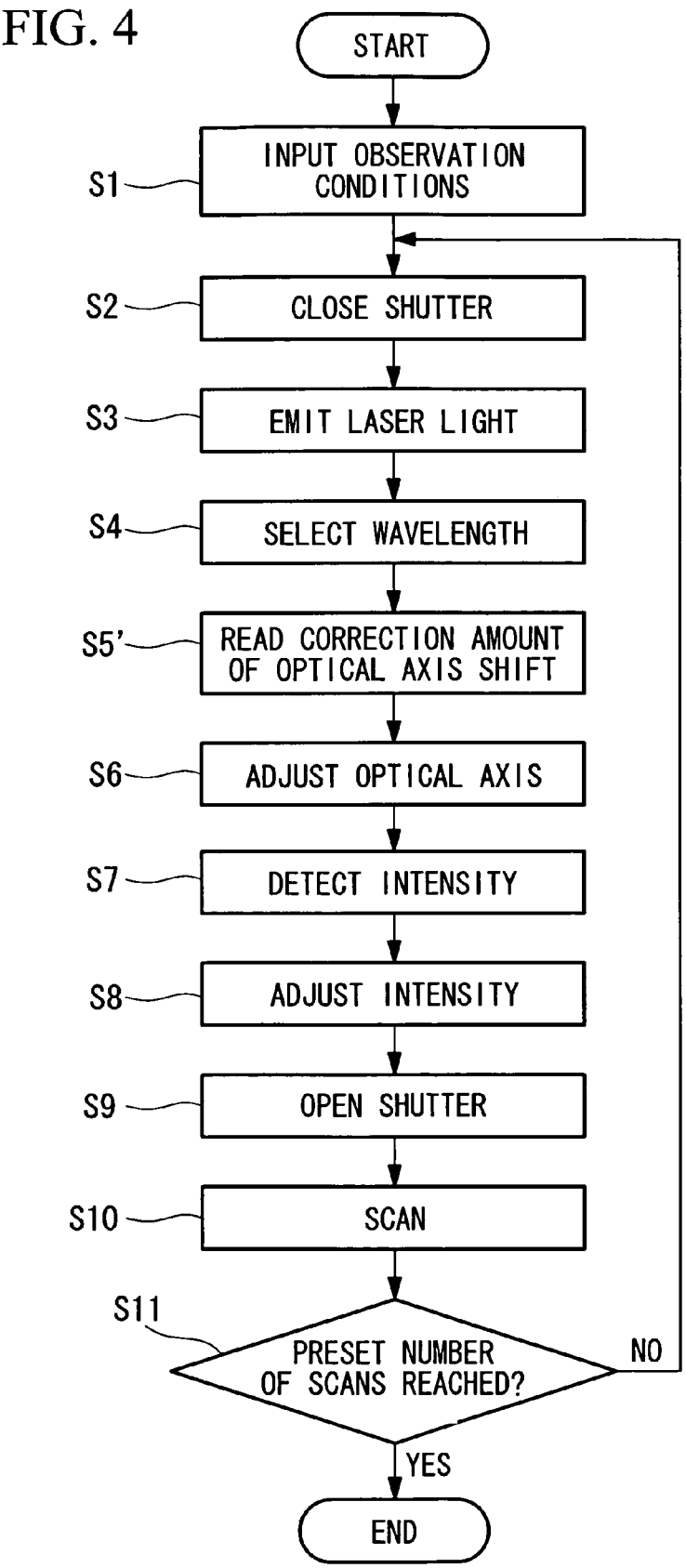
FIG. 4 is a flowchart showing the process of observation of a specimen through a modification of the laser scanning microscope shown in FIG. 1.

In the embodiment, the control device 5 receives the detection signal from the optical axis shift detecting unit 12 and calculates an adjustment value for the optical axis adjusting unit 11. Instead, a storage unit 31, as shown in FIG. 1, connected to the control device 5 may be provided for storing all wavelengths selected by the acoustooptic element 9 in association with the corresponding adjustment values (the correction amount of the optical axis shift) for the optical axis adjusting unit 11. In that case, referring to step S5' in FIG. 4, when the control device 5 selects a laser light wavelength through the acoustooptic element 9, the control device 5 may read the corresponding adjustment value in response to the selected wavelength stored in the storage unit, thereby controlling the optical axis adjusting unit 11.

In the embodiment, when the wavelength is changed or the alignment is adjusted, the shutter 17 blocks the laser light to prevent the specimen A from being irradiated with the laser light before the laser light is stabilized. However, the invention is not limited thereto. The shutter 17 may not necessarily be provided.

What is claimed is:

1. A laser scanning microscope comprising:
   a laser light source which emits a laser light having a changeable wavelength;
   a correction amount determination unit that determines a correction amount for correcting an optical axis shift of the laser light due to a change in the wavelength of the laser light emitted from the laser light source;
   an optical axis adjusting unit that adjusts an optical axis of the laser light emitted from the laser light source;
   a scanning unit that performs two-dimensional scanning with the laser light emitted from the laser light source;
   an objective lens that focuses the laser light from the scanning unit to a specimen and collects fluorescence emitted from the specimen;
   a light detector that detects the fluorescence collected by the objective lens; and
   a control unit that changes the wavelength of the laser light from the laser light source synchronously with the scanning of the laser light performed by the scanning unit while controlling the optical axis adjusting unit based on the correction amount determined by the correction amount determination unit.

2. The laser scanning microscope according to claim 1, further comprising:
   an optical axis shift detecting unit that detects an amount of the optical axis shift of the laser light emitted from the laser light source, and wherein the correction amount determination unit determines the correction amount based on the amount of the optical axis shift detected by the optical axis shift detecting unit.

3. The laser scanning microscope according to claim 2, further comprising:
   a light intensity varying unit that adjusts an intensity of the laser light;
   a storage unit that stores wavelength information of the laser light in association with intensity information of the laser light; and
   a light intensity control unit that controls the light intensity varying unit in accordance with the intensity information of the laser light stored in the storage unit when the wavelength of the laser light emitted from the laser light source is changed.

4. The laser scanning microscope according to claim 2, further comprising:
   a light intensity varying unit that adjusts an intensity of the laser light;
   a power monitor that detects the intensity of the laser light; and
   a light intensity control unit that controls the light intensity varying unit such that the intensity detected by the power monitor is maintained at a constant level when the wavelength of the laser light emitted from the laser light source is changed.

5. The laser scanning microscope according to claim 2, further comprising:
   a sensitivity control unit that adjusts a sensitivity of the light detector in accordance with the wavelength of the laser light emitted from the laser light source.

6. The laser scanning microscope according to claim 2, further comprising:
   a storage unit that stores, in association with wavelength information of the laser light emitted from the laser light source, an adjustment value for the optical axis adjusting unit controlled in response to the change of the wavelength.

7. The laser scanning microscope according to claim 2,
   wherein the scanning unit includes a driving mechanism that moves a scanning plane of the laser light in a direction of the optical axis relative to the specimen, and
   wherein the control unit operates to change the wavelength of the laser light synchronously with three-dimensional scanning in which the driving mechanism moves the scanning plane in the direction of the optical axis while two-dimensional scanning with the laser light is performed along a focal plane of the objective lens.

8. A laser scanning microscope according to claim 1, further comprising:
   a storage unit that stores wavelength information of the laser light from the laser light source in association with correction amount information for correcting the optical axis shift,
   wherein the correction amount determination unit determines the correction amount by reading from the storage unit the correction amount information of the optical axis shift in response to the wavelength, when the wavelength of the laser light is changed.

9. The laser scanning microscope according to claim 8, further comprising:
   a light intensity varying unit that adjusts an intensity of the laser light; and
   a light intensity control unit that controls the light intensity varying unit in accordance with intensity information of the laser light stored in the storage unit when the wavelength of the laser light emitted from the laser light source is changed,
   wherein the storage unit further stores the intensity information of the laser light in association with the wavelength information of the laser light.

10. The laser scanning microscope according to claim 8, further comprising:
    a light intensity varying unit that adjusts an intensity of the laser light;
    a power monitor that detects the intensity of the laser light; and
    a light intensity control unit that controls the light intensity varying unit such that the intensity detected by the power monitor is maintained at a constant level when the wavelength of the laser light emitted from the laser light source is changed.

11. The laser scanning microscope according to claim 8, further comprising:
    a sensitivity control unit that adjusts a sensitivity of the light detector in accordance with the wavelength of the laser light emitted from the laser light source.

12. The laser scanning microscope according to claim 8,
    wherein the scanning unit includes a driving mechanism that moves a scanning plane of the laser light in a direction of the optical axis relative to the specimen, and
    wherein the control unit operates to change the wavelength of the laser light synchronously with three-dimensional scanning in which the driving mechanism moves the scanning plane in the direction of the optical axis while two-dimensional scanning with the laser light is performed along a focal plane of the objective lens.

* * * * *